Feb. 21, 1933.  C. A. SCHACHT  1,898,690

DISH SCRAPER

Filed Aug. 27, 1932

Inventor
Clifford A. Schacht

Alexander McDonald
By
Attorneys

Patented Feb. 21, 1933

1,898,690

UNITED STATES PATENT OFFICE

CLIFFORD A. SCHACHT, OF HUNTINGTON, INDIANA

DISH SCRAPER

Application filed August 27, 1932. Serial No. 630,727.

This invention is a novel improvement in dish or sink scrapers and the like such as shown in my U. S. Letters Patent No. 1,647,751, dated November 1, 1927; and the principal object thereof is to provide a scraper molded in one piece having a flexible rubber blade and an integral reinforced hard or non-flexible rubber handle extending partially into the blade, the scraper being particularly adapted for use as a dish scraper, sink scraper, or the like.

Heretofore, scrapers have been used having flexible rubber blades, but the handles therefor have been made of metal, wood, or the like, attached to the blade by different methods and means, but such scrapers have been found unsatisfactory and unsanitary in that the handles eventually become loose, and cut or tear the rubber blade, and moreover it is almost impossible to keep the connection between the handle and the scraper free from dirt, grease, food, and other germ carrying mediums.

In my novel scraper, however, the handle and blade are molded simultaneously and integrally without necessitating the use of wire or other reinforcing or stiffening material in the handle as in my aforesaid patent, the blade being of soft rubber and the handle being of hard or semi-hard rubber, the blade and handle being vulcanized together so that the blade will be flexible and the handle non-flexible. If desired, the handle portion may be previously molded of hard or semi-hard rubber before being inserted in the mold for vulcanization with the soft rubber blade. The hard or semi-hard rubber handle of the scraper furthermore extends partly into the soft rubber blade to stiffen the rear portion of the blade, and prevent the blade from breaking off of the handle when in use. The cutting edge of the blade readily conforms with the shape or curvature of the surface to be scraped, and since the hard or semi-hard rubber handle and the soft rubber blade are molded in one piece, there are no joints or connections between the handle and the blade wherein dirt, grease, food, etc., might lodge. Moreover no screws, nails, or rivets are required for attaching the handle to the blade.

My scraper can be easily cleaned; and is inexpensive to manufacture, the article being practically finished when it comes from the mold.

I will explain the invention with reference to the accompanying drawing, which illustrates one practical embodiment thereof to enable others to adopt and use the same, and will summarize in the claims the novel features of construction, and novel combinations of parts, for which protection is desired.

In said drawing:—

As shown, my novel dish or sink scraper preferably comprises a rubber blade 1, thickened as at 1a at its rear portion, said blade being slightly wedge-shaped or tapering from the portion adjacent the handle 2 towards the front edge; and said blade being substantially semi-circular as shown, but may be made in any other desired shape to suit the particular requirements for which it is to be used.

Figure 4:
Fig. 4 is a transverse section on the line 4—4, Fig. 1.

Extending from the rear or thickened portion 1a of the blade 1 is an integral non-flexible rubber handle 2, preferably substantially elliptical in cross-section as in Fig. 4, but may be of square, oblong, circular or any other desired cross-section. On the outer end of the handle 2 is an integral perforated ear 2a, whereby the scraper may be suspended from a cord, nail, or other support, when not in use.

Handle 2 is of hard or semi-hard rubber and is vulcanized in a mold together with the soft rubber blade 1 or may be pre-formed by molding, and is of sufficient length to extend partly into the rear thickened portion 1a of the soft rubber blade 1 to stiffen the rear portion of the blade while permitting the front edge to conform readily with the surface to be scraped. The hard or semi-hard rubber forming the handle 2 is placed in a mold with the soft rubber which is to form the blade 1 and the handle and blade thus molded integrally whereby the scraper will be practically finished when taken from the mold.

Figure 1:
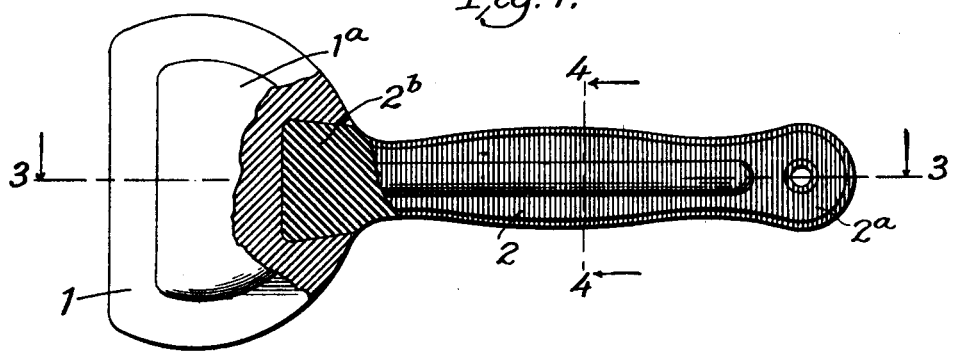
Fig. 1 is a front view of the scraper partly in section.
Figure 2:
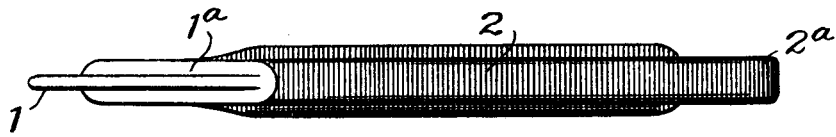
Fig. 2 is a side view thereof.
Figure 3:
Fig. 3 is a longitudinal section on the line 3—3 of Fig. 1.

In order to give the blade 1 the desired stiffness the inner end of the handle extends into and is embedded in the rear thickened portion of the blade 1, the portion 2b of the handle 2 which is hard or non-flexible, being shown in Figs. 1 and 3 as extending into the rear thickened portion 1a of the blade 1 which latter is of flexible rubber. The particular shape of the portion 2b of the handle is not important provided it is of sufficient area to stiffen the blade 1.

My novel dish scraper provides a sanitary one piece rubber scraper having an integral hard or semi-hard rubber handle extending partially into the blade, the handle being substantially non-flexible, and can be readily cleaned; and there are no joints or connections between the handle 2 and blade 1 wherein grease, dirt, or food may collect. Moreover, the scraper may be manufactured at a low cost, since the article is practically finished when it comes from the mold.

I claim:—

1. A scraper comprising a flexible rubber blade, and an integral handle of non-flexible rubber.

2. A scraper comprising a flexible rubber blade, and an integral handle of non-flexible rubber, the handle extending partly into the blade and secured therein.

3. A scraper comprising a flexible rubber blade having a scraping edge, an integral handle of non-flexible rubber extending from the blade at right angles to the scraping edge; the handle extending into the rear portion of the blade and secured therein.

CLIFFORD A. SCHACHT.